Feb. 3, 1970 W. H. CARSTENSEN ET AL 3,493,358
GLASS-METAL JOINING APPARATUS
Filed Sept. 21, 1966 4 Sheets-Sheet 1

INVENTOR.
WALTER H. CARSTENSEN
BY RAYMOND A. REISBACH
O. R. Birchall
W. A. Schaich
ATTORNEYS

INVENTOR.
WALTER H. CARSTENSEN
RAYMOND A. REISBACH
ATTORNEYS

United States Patent Office 3,493,358
Patented Feb. 3, 1970

3,493,358
GLASS-METAL JOINING APPARATUS
Walter H. Carstensen and Raymond A. Reisbach, Toledo, Ohio, assignors to Owens-Illinois, Inc., a corporation of Ohio
Filed Sept. 21, 1966, Ser. No. 580,959
Int. Cl. C03c 27/02, 27/00
U.S. Cl. 65—154
5 Claims

ABSTRACT OF THE DISCLOSURE

Apparatus for sealing a metal insert into the interior wall of the glass faceplate panel of a cathode-ray tube. The faceplate panel is positively positioned and retained in prearranged alignment by a plurality of upstanding fixed support members, a plurality of coacting vertically moveable rigidly connected support members, and a plurality of pairs of upwardly-extending arms pivotally mounted, having outwardly-facing positioning elements. All of these supports and arms contact the inner surface of the panel. A plurality of metal insert retention members having a heat-resistant holder with an outwardlly facing recess for receiving the insert, are mounted interiorly of the panel. An electrical heating unit surrounds the holder and heats the inserts. Means move the retention members outward so that the inserts are embedded in the interior surfaces of the flange portion of the panel.

This invention relates to an apparatus and method useful in inserting metal studs into the surface of glass articles. More particularly, the present invention relates to sealing metal members into glass articles and to fabricating hollow glass articles that have a plurality of stud-like members embedded in the inner surfaces of their sidewalls. By way of example, the hollow glass article may be the flat viewing portion of a television tube known as the faceplate. The studs are inserted on the interior wall of the flange that is an integral part of the frontal area or section of the television faceplate.

The metal inserts are designed so that a structural load may be supported thereform. Other adaptations of the cathode ray tube and for that matter additional glass structural items may equally well be joined with metallic studs as taught by this invention. The glass article may be a television faceplate adapted to serve as the viewing screen for a color receiving television set. Such articles are equipped with a heavy color-controlling aperture mask or grid that must be retained in very close proximity to the interior surface of the viewing screen and also the mask must be supported so that the alignment can be duplicated a number of times. The present invention is especialy applicable to inserting metal studs into the interior walls of television faceplates for color television picture tubes that are rectangular or circular in overall configuraion when viewed from the front or picture side.

Prior art attempts have been made to solve the problem of inserting a plurality of metal inserts into the interior surface of the flange portion of color television faceplates. An example of the prior art has been disclosed in U.S. Patents Nos. 2,949,702 and 3,021,643, both emanating from the same original disclosure and issued in the name of Blanding et al. on Aug. 23, 1960 and Feb. 20, 1962 respectively. The above cited patents relate to method and apparatus for sealing a number of hollow metal studs into the interior wall of the faceplate skirt portion after both the inserts and the glass sidewall in the mounting or insertion regions have been suitably heated to a working temperature by the utilization of gas fed burner flames. In the Blanding et al. disclosures, the trapped air within the hollow inserts is relied upon to pneumatically force the metal stud in an outward direction from the glass surface thus producing a filleted contour around the glass-metal interface to provide a strong and reilable seal. Thus it can be readily determined that the above described prior art method would not work if the metal stud were equipped with an axially aligned aperture therethrough. Also, the use of burner flames to heat both the metal inserts and the interior surfaces of the television faceplate sidewall, the latter to near plasticity, have encountered the serious problem of loose dirt particles being embedded into the glass adjacent the stud in the form of metallic oxide contamination, which cannot be tolerated in providing stud-like mounting members that are designed to carry the heavy frame of massive color-controlling structure such as an aperture mask. The prior art disclosures have been directed to heating both the metallic stud and the glass sidewall by the same heat source wherein the flame passed over the surface of the metal stud prior to reaching the glas surface. The prior art has not provided an entirely satisfactory solution to the problem of acurately locating and mounting the metallic stud inserts in a sealed position with the surrounding glass being free from contamination and/or defects.

With the above problem in mind, it is an object of this invention to seal a plurality of inserts in the interior of a hollow glass member such as a color television picture tube faceplate, the inserts being electrically heated both prior to and during their positioning in the glass in precise alignment with respect to a reference plane.

Another object of the present invention is to positively position and retain a holow glass television faceplate in prearranged alignment and to electrically heat a series of stud members interiorally of the panel and to forcefully embed each stud member in finally-disposed alignment while continuing their heating by an induced current therein.

A further object of this invention is to provide a method for fabricating the faceplate member of a color television picture tube envelope by forcefuuly embedding a series of hollow metal inserts that have been heated by an electrical current both prior to and during embedding into the glass interior surface in precise alignment with respect to both angular and reference plane alignment.

An additional object of the present invention is to immobilize a heated hollow-glass television faceplate member in a horizontal plane with its sealing edge projecting downwardly and simultaneously electrically heating a series of inserts interiorly of the faceplate both immediately prior to and during forceful embedding of the inserts in the interior surfaces of the glass flange portion.

In achieving the desired results of the present invention, it is desirable that the television faceplates be in the range of about 900°–1000° F. which corresponds to near or slightly above the annealing point temperature of the glass. The faceplate may be selected for stud insertion just after it has been pressed or it may be permitted to cool and subsequently be preheated to the desired working temperature. The entire faceplate may be heated to he required temperature for stud insertion, however if desired, localized areas of the flange portion in the area where the studs are to be inserted may be heated locally to the indicated annealing temperature. The heating or preheating of the faceplate is desirable to eliminate or reduce thermal shock in those areas of the faceplate flange where the heated inserts are forced into the glass.

Further objects and advantages of the invention will be readily apparent from the following description when taken in conjunction with the drawings wherein the mechanical features are clearly shown.

The present invention as described hereinafter, is specifically applicable to the manufacture of the faceplate member of a color television picture tube envelope; however, it would be apparent to those skilled in the art of glass to metal sealing that the invention is equally applicable to the manufacture of many different glass component parts that find use in other electron discharge devices that require metal inserts sealed thereinto in precise alignment for load bearing or electrical considerations. The invention is not to be restricted to the heating of metallic inserts since it is conceivable that other conductors could equally well be heated by induction heating and forced into sealing engagement with a glass article.

Figure 1:
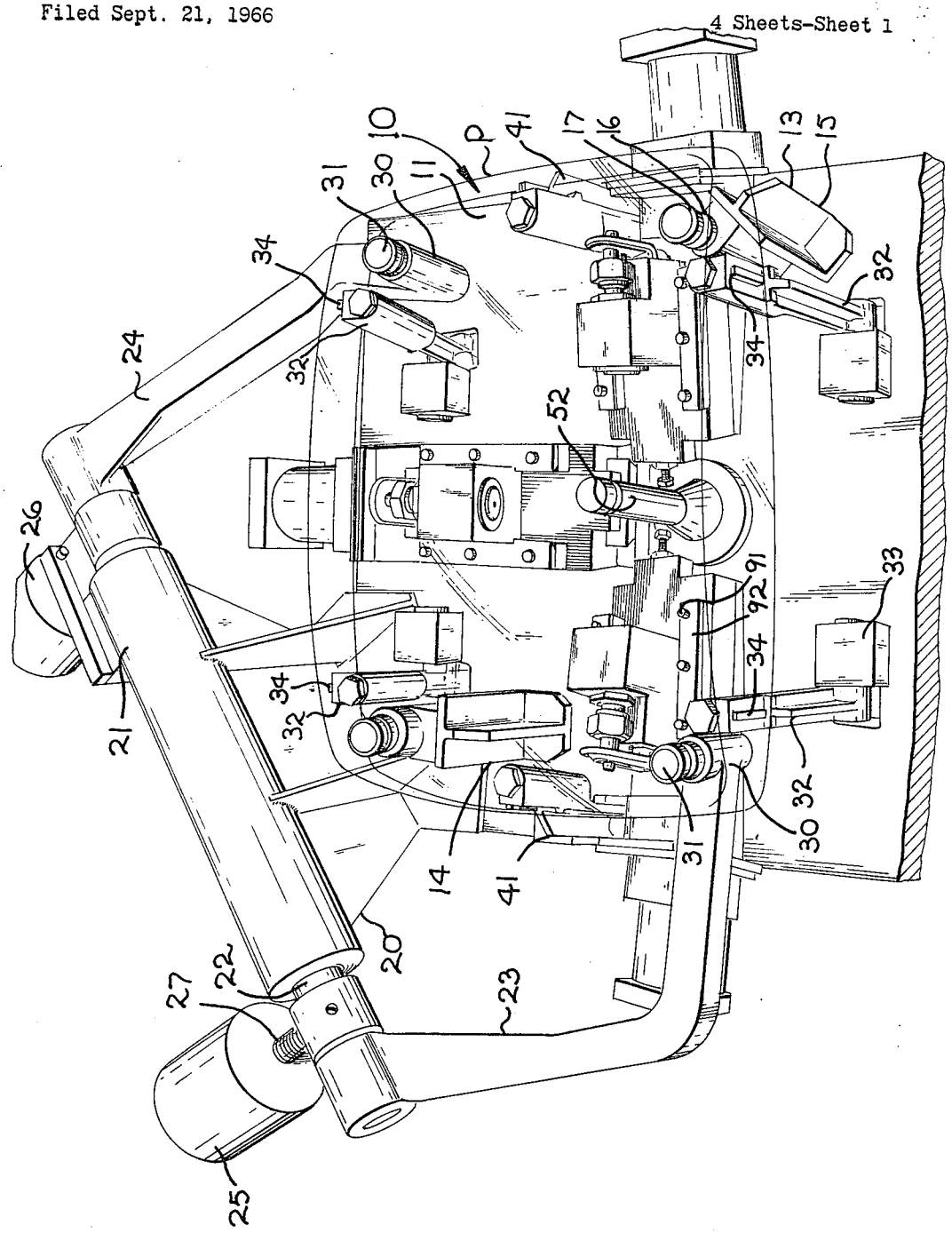
FIG. 1 is a perspective view looking down upon the top working surface of the stud insertion apparatus.
Figure 3:
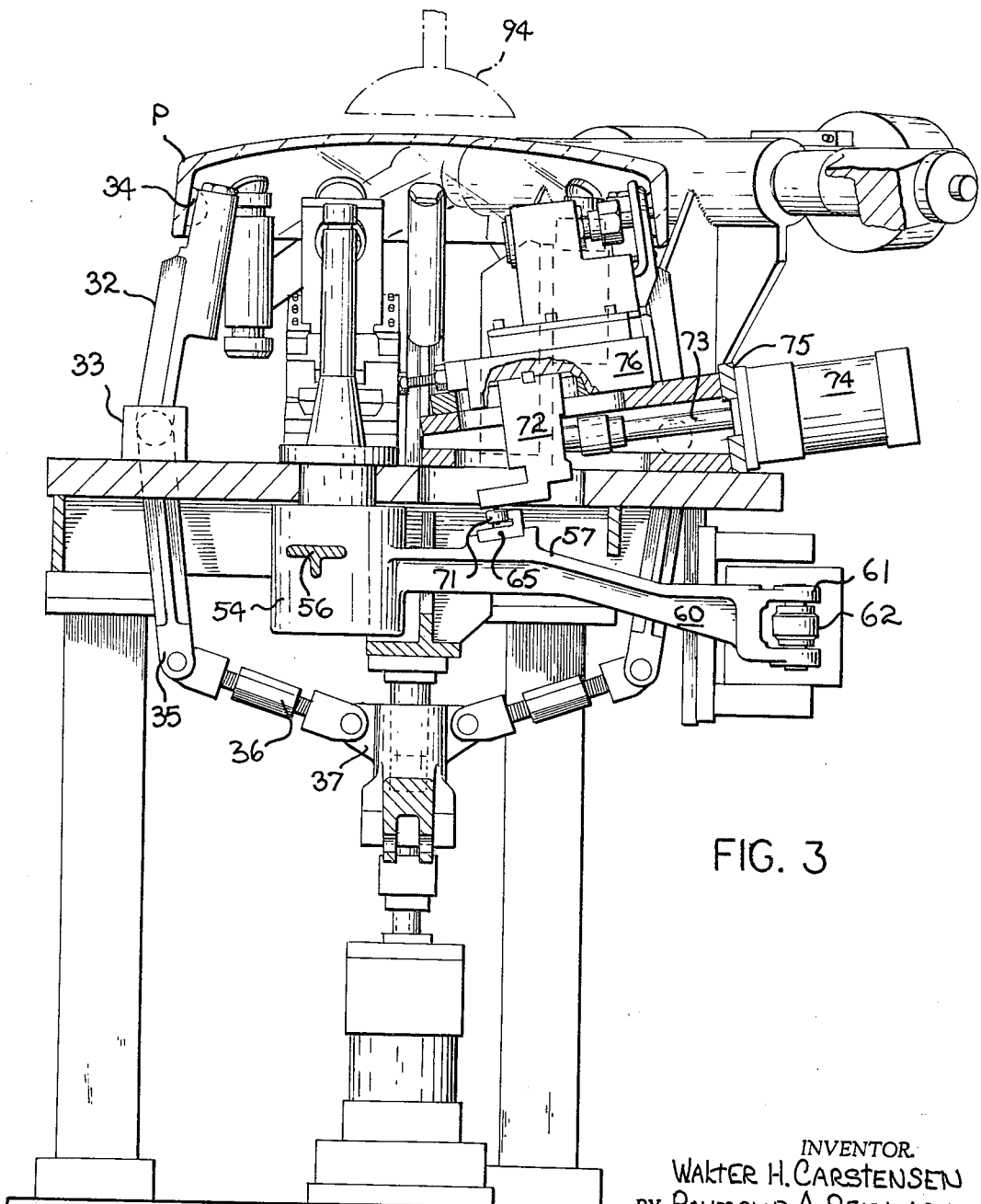
FIG. 3 is a side view part in section and also taken with the line of sight generally along the top of the work table.

Referring to the drawings in detail, and particularly to FIG. 1, the sealing apparatus comprises a work table 10 that has a substantially horizontal top 11. Top 11 is a structural member that provides support for various operating parts mounted on the top and bottom thereof. Table top 11 is supported by conventional upright frame members as shown in FIG. 3.

Extending upward to support a television faceplate and mounted from top 11, are support columns 13 and 14. Column 13 is made from an angle support structure 15 which is anchored to the top of table 11 by suitable means not shown. Attached to support structure 15 and oriented generally normal to the top of table 11 is hollow cylindrical section 16 that contains a spherically convex button 17 mounted on the top thereof. Button 17 is flat on its top side, and the spherical lower half can rotate freely in any direction to accommodate the interior surface of a television faceplate. Supports such as button 17 can be made from materials such as carbon or cast iron or any other heat conducting, non-marring material. Hollow cylindrical section 16 contains a heating element (not shown) so that button 17 will more nearly match the temperature of the glass article which it supports. For all practical purposes, support columns 13 and 14 are identical and are arranged at diametrically and diagonally opposite sides of work table 10.

At one side of the table top 11 and preferably at the rear is an upwardly extending support member 20 that terminates near the top with a horizontally aligned hollow bearing shaft 21. Running through and supported by bearing shaft 21 is axle 22 to which are mounted a pair of coacting support arms 23 and 24. Support arms 23 and 24 are rigidly keyed to axle 22 so that both arms will move through the same angular rotation when axle 22 is revolved. A pair of counterweights 25 and 26 are also rigidly attached to axle 22 and are cantilevered generally in the opposite direction from arms 23 and 24. Counterweights 25 and 26 are adjustable as shown at 27, and their center of gravity can be varied from the longitudinal axis of axle 22 in order to offset the insuing moment produced by the weight of arms 23 and 24.

Support arms 23 and 24 each contain an upwardly turned hollow section 30 that is affixed on the top with a spherical support button 31 which is similar to buttons 17 on support columns 13 and 14. A heater is mounted within hollow section 30 and is connected to a flexible electrical source (not shown).

When a television faceplate P is positioned on diagonally positioned upright supports 13 and 14, it is free to tilt or rotate about a line or axis extending from the centers of spherical supports 17 that are mounted on top of support columns 13 and 14. In so rotating about the aforementioned axis, the interior surface of the faceplate comes in contact with one of support buttons 31 which are mounted on the extremities of coacting arms 23 and 24. The direction of rotation of faceplate P about an axis from the tops of supports 13 and 14 is stopped immediately as soon as the interior of faceplate P contacts one of support buttons 31. The direction of rotation of faceplate P about an axis extending from the tops of support columns 13 and 14 is reversed under an upwardly biasing force supplied by the first support button 31 to make contact with the interior surface of faceplate P. Upon the seating of support buttons 31 on arms 23 and 24, faceplate P is stabilized by a four-point contact and all tilting or rotation ceases. The upward biasing force of buttons 31 is supplied by adjusting counterweights 25 and 26 so that they more than offset the weight of arms 23 and 24. While arms 23 and 24 exert an upward force, it is not great enough to lift the entire faceplate P.

Once faceplate P has been arranged in a generally horizontal attitude with the peripherally extending flange thereof pointed in a downwardly direction, it is then ready for a lateral, fore and aft centering. To facilitate movement or centering in the horizontal direction, a plurality of lateral clamping arms have been attached to top 11 of table 10. Four arms designated each by numeral 32 are centrally pivoted and attached to the top of table 10 by pivot blocks 33. Arms 32 are pivoted near the center of their overall length thus they extend above and below table 10 approximately the same distances. The top of each arm 32 is hollow and contains a heating element (not shown) which keeps elongated support pad 34 at a temperature that is compatible with the glass surface of the faceplate. Support pads 34 can be made from carbon or other suitable materials. The vertical extent of arms 32 can be seen in FIG. 3 along with pivot blocks 33. The bottom end of arm 32 is bifurcated at 35 to facilitate its pinned engagement to one end of adjustable linkage 36. Linkage 36 is also pivotably connected to hub 37. The full extent of hub 37 can be best seen in FIG. 2. Hub 37 is attached to the top of the piston of actuator 40 which is mounted from the bottom support structure of table 10.

Thus it will be readily apparent that when the piston of actuator 40 is moved, hub 37 will force adjustable linkage 36 to act against bifurcated end 35 of arm 32 thus causing both of the support pads 34 to move equally in essentially opposite lateral directions. As shown in FIG. 3, pad 34 fits against the interior surface of the downwardly extending flange of faceplate P. Since there are a plurality of arms 32 positioned diametrically across the extent of faceplate P, the faceplate will be moved fore and aft as viewed in FIG. 1. Faceplate P will also be rotated slightly if need be so that supports 34 of all arms 32 will index against the interior of the downwardly extending faceplate flange.

Figure 2:
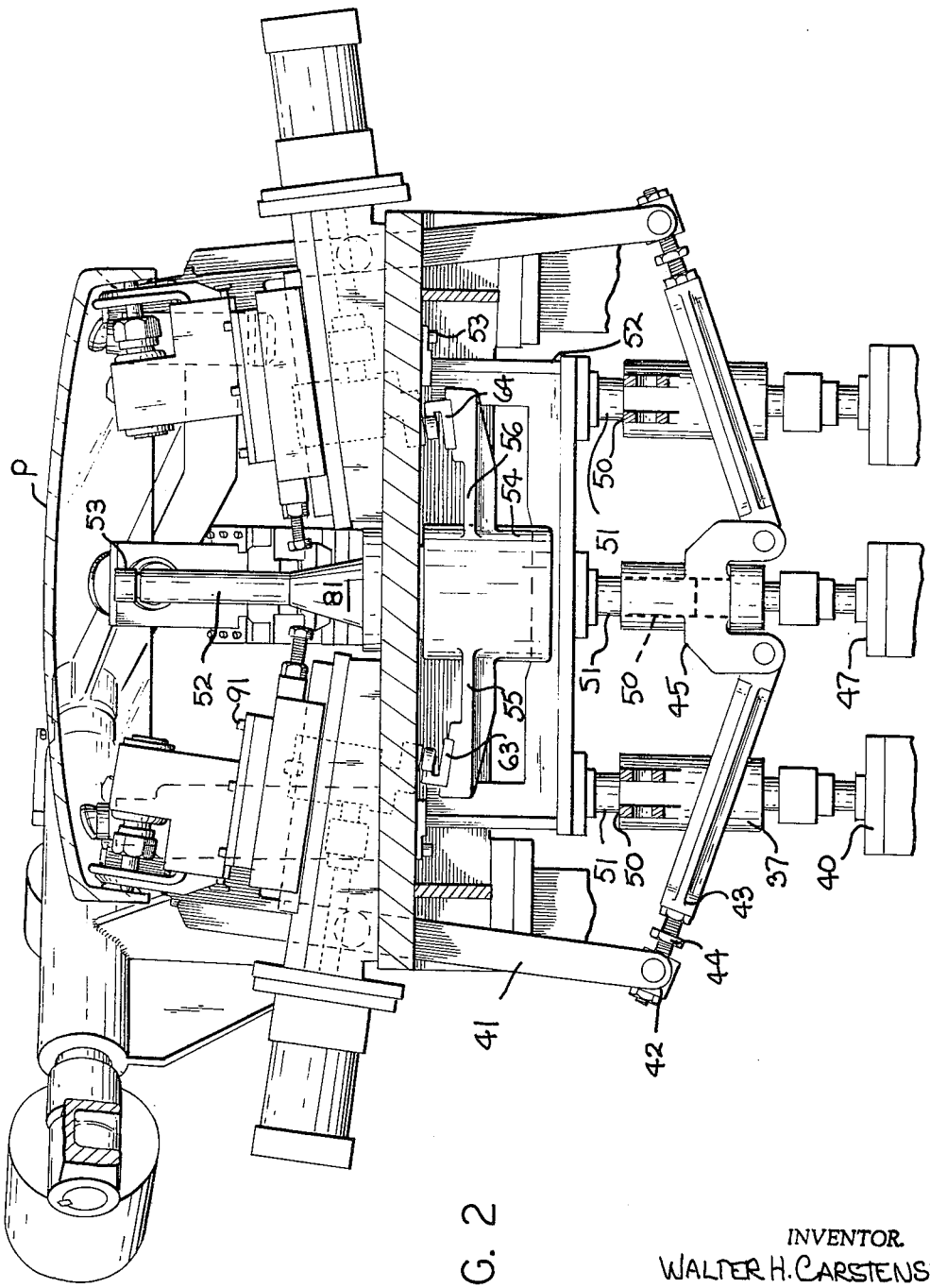
FIG. 2 is an elevational front view with the line of sight generally along the top of the work table.

Referring back to FIG. 1, there can be seen two additional positioning arms 41 positioned opposite each other and located along the long axis of faceplate P. Arms 41 are similar in construction to arms 32 and also terminate at their lower extremity with a bifurcated end 42 as shown in FIG. 2. End 42 is pivotably coupled to linkage casting 43 by a screw adjustment 44. Casting 43 is of split construction with a large aperture therein to permit hub 37 to pass therethrough. The lower end of casting 43 is pivotably connected to the movable hub 45 of actuator 47.

By raising and lowering the piston of actuator 47 which is anchored to the support structure of table 10, it can be ascertained that arms 41 will pivot about their support points on the top of table 10 and thus the top ends, or support pads, will move laterally with respect to each other thus exerting a centering effect on faceplate P in that direction.

By having two sets of centering arms, that is arms 43 and arms 32, the faceplate can be centered first in one direction, then in the other direction. Then with all arms extended, the faceplate is both centered and clamped in position. If desirable, both actuators 40 and 47 can be actuated together thus causing the arms both, fore and aft, and lateral to move simultaneously in centering faceplate P.

When all arms are in the extended position, the faceplate will be centered and also clamped in position since the outward motion of arms 43 and 32 is accomplished under the influence of powerful actuators 40 and 47.

In order to further assure the accuracy of arms 32 and 41 in their outward movement, the hubs 37 and centrally located hub 45 contain cylindrical bores 50 into which are positioned downwardly disposed shafts 51. Hubs 37 and 45 can slide relative to shafts 51. Shafts 51 are cantilevered downward from bridge structure 52 which is anchored to the bottom of work table 10 with fasteners such as 53. The bridge structure 52 can be seen in FIGS. 2 and 3.

A central post structure 52 is mounted in upright fashion from the top 11 of table 10. Post 52 can also be seen in FIGS. 2 and 3. The top 53 of post 52 is machined so that a check fixture can be referenced therefrom in order to determine whether the studs are being installed at the proper location and at the proper angle with respect to the faceplate P. In addition to serving as a reference point, post 52 continues downward through top 11 of table 10 and forms a spindle below the table top to which is mounted spider casting 54. Casting 54 is rotatably attached to the end of the spindle by a conventional bearing support and retaining means (not shown). Casting 54 contains two outwardly extending arms 55 and 56. Arms 55 and 56 can be seen in FIG. 2 and the cross section of arm 56 is shown in FIG. 3. A third protruding arm 57 is attached so that it extends in a direction opposite to outwardly extending arms 55 and 56. Arm 57 has an extension 60 that is clevised at the end 61. Pivotably connected to end 61 of arm 57 is the end of an actuator 62. Actuator 62 is not shown in full, however it is attached to the framework beneath the table so that it can act against the long arm of spider casting 54. Under the influence of actuator 62 spider casting 54 can rotate about the downwardly extending spindle of post structure 52.

Toward the outer extremities of arms 55 and 56 of spider casting 54, cam blocks 63 and 64 are mounted facing in an upward direction. Cam blocks 63 and 64 can be viewed in FIG. 2. In FIG. 3, a third cam block 65 can be seen which is mounted on the top central section of long arm 57. All three cam blocks 63, 64 and 65 are positioned equidistant from the vertical axis defined by post structure 52 and its downwardly extending spindle to which is rotatably attached spider casting 54.

Figure 4:
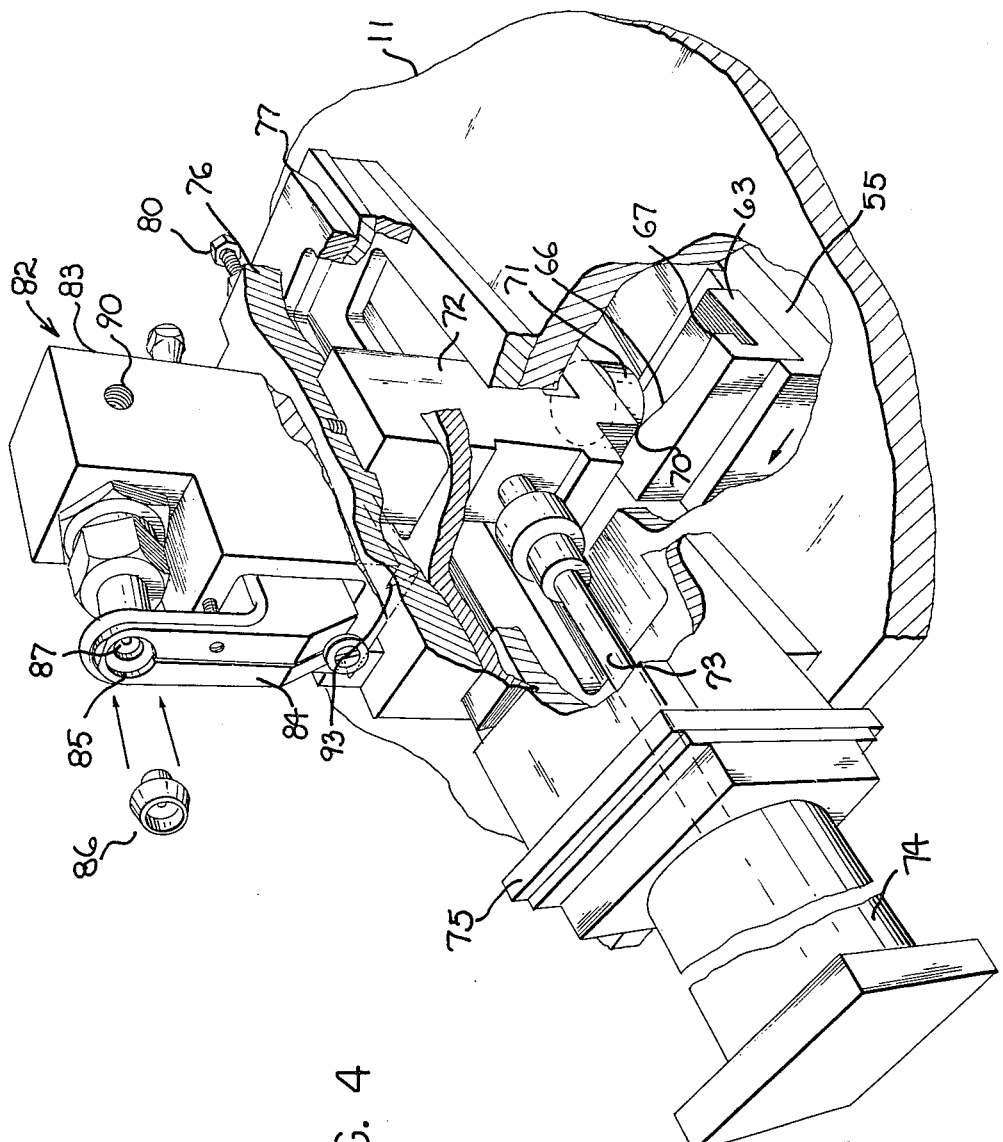
FIG. 4 is a cut-away perspective view showing the mechanism for controlling the movement of the heating transformer.

FIG. 4 shows toward the bottom of the drawing a perspective view of a typical cam block such as 63. Curved surface 66 is of spiral configuration in that end 67 is spaced a greater distance away from the vertical axis of post structure 52 than is end 70 of cam block 63.

Referring to FIG. 3 a cam follower 71 is rotatably attached to the bottom block 72. Cam follower 71 and block 72 are also shown in perspective in FIG. 4. When spider casting 54 is rotated under the influence of actuator 62, cam follower 71 will move either nearer or farther away from the vertical axis of post structure 52 depending upon whether the actuator 62 is rotating spider casting 54 clockwise or counterclockwise. Actuator 74 continuously exerts a biasing force in an inward direction, that is, piston arm 73 is always under a tensile load thus firmly maintaining cam follower 71 in close contact with the curved surface 66 of cam block 63. Thus it can be seen that actuator 74, which may be air operated, acts as a spring in maintaining cam follower 71 in contact with cam block 63 regardless of its position.

Block 72 which carries cam follower 71 attached to its lower extremity is also attached to piston arm 73 of actuator 74. Actuator 74 is mounted to the large end of a wedge-shaped support structure 75 which is securely attached to table top 11.

The above structure can also be seen in the cut-away perspective view of FIG. 4. Block 72 has a transformer carrier plate 76 attached to the top by suitable fasteners. Transformer carrier plate 76 is contained in position by grooved plate 77 which forms a part of support structure 75. Transformer carrier plate 76 is free to slide along grooved plate 77. An adjustable stop 80 is securely anchored to the lower end of transformer carrier plate 76. Stop 80 abuts against the frusto-conical surface 81 of post structure 52.

On top of transformer carrier plate 76 is a high frequency heating transformer 82. Transformer 82 contains a primary induction coil within housing 83 and induces an increased current in the single secondary turn or coil 84 which contains an aperture 85 for surrounding of the metallic stud 86. A ceramic stud holder 87 is positioned concentrically within aperture 85 of secondary coil 84. Ceramic stud holder 87 has a central bore therethrough that is in communication with aperture 90. A vacuum line (not shown) can be threadedly engaged with the internal threads of aperture 90. Further adjustment between transformer 82 and transformer carrier plate 76 is provided by bolts 91 (FIGS. 1 and 2) which act to clamp bars 92 into locking engagement with grooves 93. Thus transformer 82 can be positioned for optimum stud penetration into the interior of the flange portion of a television faceplate or other similar object requiring a metallic stud.

During the initial set-up of the apparatus of this invention a check template (not shown) is attached to top 53 of post structure 52 which can be seen in FIGS. 1, 2 and 3. The amount of movement of carbon support pads 34 on the outward top face of arms 32 and 41 can be checked and adjusted by means of linkages 36 and screw adjustment 44. The movement or travel of transformer 82 and the stud 86 that it carries can also be checked and adjusted by means of bolts 91 and clamp bars 92.

In actual use of the present invention, studs such as 86 (FIG. 4) are inserted into ceramic stud holder 87 whereupon they are firmly grasped and retained by the application of a vacuum through the line (not shown) leading to aperture 90. With the studs 86 in position, a preheated or hot television faceplate is lowered down upon the apparatus with the flange turned downward. The internal surface of the faceplate first contacts and settles to rest upon support buttons 17 and/or support buttons 31. Buttons 17 provide a rigid two point support and support buttons 31 through their common linkage actually supply a third point which in this instance is split. Through the above support system a three-point suspension plane is established. The faceplate comes to rest upon the four contact points supplied by buttons 17 and 31. Support arms 23 and 24 have rotated about the axis of the shaft or axle 22 to which they are attached in order to accommodate the faceplate. Actuators 40, which are coupled together pneumatically so that they act in unison, are activated so that their pistons travel in a downward direction thus sliding hubs 37 along the two outboard downwardly extending shafts 51 that are supported by bridge structure 52. The downward biasing of hubs 37 cause bifurcated ends 35 of arms 32 to be moved in an inward direction through the action of linkages 36. Since arms 32 have a centrally located fulcrum in supports 33, the uppermost ends of arms 32 and the support pads 34 that they carry are moved in an outward direction. Each support pad moves outward exactly the same distance thus if the television faceplate is off to one side or slightly rotated, it will be oriented so that it is in alignment in the fore and aft direction. In a similar manner, actuator 47 is biased downward thus causing the carbon support pads associated with arms 41 to move outward thus centering the faceplate in a lateral direction. All of the centering arms 32 and 41 can be actuated simultaneously or else one or the other sets of arms can be operated first. Since arms 32 and 41 serve a dual purpose, they can be extended after the faceplate has been heated, in order to clamp the faceplate in position for insertion of studs 86.

After the faceplate has been centered and clamped in position by arms 32 and 41, a hold-down device as shown in dotted lines at 94 in FIG. 3 can be lowered into engagement with the top central surface of the faceplate to additionally aid in clamping the faceplate. Hold-down device 94 is of conventional design and need not be further discussed herein. While hold-down device 94 is not absolutely necessary for the successful operation of this invention, it provides additional assurance that the faceplate will remain immobilized during stud insertion.

Actuator 74 is activated so that piston arm 73 (FIG. 4) is retracted toward the actuator. Since block 72 is firmly attached to the end of piston arm 73, it too moves and carries cam follower 71 into engagement with end 70 of the curved surface 66 of cam block 63. Block 72 also carries transformer carrier plate 76 up along the inclined plane provided by support structure 75. The inclined plane may be such that it matches the internal taper of the flange of the faceplate. In this manner, a stud can be oriented normal to the actual internal surface of the flange. The inclined plane arrangement as set forth above can insert studs other than normal to the glass surface if desired. When the cam follower makes contact with end 70 of cam block 63, the stud, as held by transformer 82, is adjacent to but not in actual contact with the glass surface of the faceplate. In this position, transformer 82 may be energized and through the action of the induced current within the stud as a result of the single loop secondary coil of the transformer, the stud is quickly heated until it is red hot. In order to heat the stud prior to the advance of transformer carried plate 76, the transformer may be turned on at the start of the cycle if desired. The heat radiating from the hot stud, which is in close proximity to the glass, helps to additionally heat the glass. After a predetermined time interval, actuator 62 (FIG. 3) is activated and slowly begins to rotate spider casting 54. As spider casting 54 rotates in the direction of the arrow shown in FIG. 4, cam follower 71 moves from end 70 to end 67 of cam block 63. In so doing, actuator 74 is permitted to draw the stud 86 into engagement with the glass surface of the flange whereupon it slowly sinks into seating engagement with the glass. After a firm interaction or bonding between the stud and the glass has been achieved, actuator 62 is caused to reverse its action thus causing transformer 82 to back away from the interior of the faceplate flange. Actuator 62 can be of the type with a reversible action or else an additional actuator can be coupled in line with actuator 62 and through its influence, actuator 62 may be pushed back to effect the withdrawal of the studs from the interior flange of the television faceplate. The stud is thus pulled out of the glass a slight amount by the action of a gripping force supplied by the vacuum which is still applied to the stud. The high frequency electrical source is disconnected from transformer 82 so that it no longer will heat studs 86. After a short duration, during which the molten glass has an opportunity to solidify in adhered contact with the exterior surface of the stud, the vacuum is released from the stud and actuator 74 is permitted to extend its piston thus letting the transformer back away from the flange of the faceplate. The hold-down device 94 is removed from the top surface of the faceplate and the carbon support and alignment pads 34 are released from engagement with the interior of the flange.

The entire sequence of operation of the various actuators and their electrical, pneumatic and vacuum interconnections are well known to those skilled in the art therefore they have been omitted in favor of the actual mechanical arrangement heretofore described in detail.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for sealing a metal insert in precise alignment into the interior surface of an annular flange portion of a hollow glass faceplate panel of cathode-ray picture tube envelope, said apparatus comprising:
   a base plate having a plurality of upstanding fixed support members arranged in juxtaposed position and a plurality of coacting vertically-movable support members arranged in juxtaposed pivotal position and rigidly connected, one with the other, to support the inner surface of the viewing area of said faceplate panel at a predetermined elevation with respect to a reference plane,
   a plurality of pairs of upwardly-extending arms pivotally mounted on said base plate having outwardly-facing positioning elements for contacting the interior flange surface of said faceplate panel,
   means to pivot said arms outwardly to cause said positioning elements to engage the interior surface of said flange portion to position said panel with respect to a set of predetermined axes,
   a plurality of metal insert retention members reciprocatably mounted in spaced array interiorly of said panel when positioned for insert sealing,
   each retention member having a heat-resistant holder with an outwardly-facing insert receiving recess surrounded by an electrical heating unit to heat said insert when retained within said recess, and
   means for effecting outward movement of said insert retention members for positively positioning said inserts in embedded relation within the interior surface of the flange of said faceplate panel.

2. An apparatus in accordance with claim 1, wherein said base plate has a pair of upstanding fixed support members arranged in juxtaposed position and a pair of coacting vertically-movable support members arranged in juxtaposed pivotal position to support the faceplate panel in said reference plane.

3. An apparatus in accordance with claim 1, wherein said electrical heating unit comprises an induction heating element having a one turn inductor work coil surrounding said insert receiving recess, said heating element being energized by a high-frequency electrical power source.

4. An apparatus in accordance with claim 1, wherein said heat-resistant holder comprises a ceramic member having a circular pocket for receiving a metal insert having a complemental contour, and a vacuum line connected to an opening in said electrical heating unit for firmly retaining said insert.

5. An apparatus as claimed in claim 1 wherein a centrally disposed reference point is mounted to aid in the alignment of said insert retention members and said contact points of said upwardly extending members.

References Cited

UNITED STATES PATENTS

| | | | |
|---|---|---|---|
| 2,637,942 | 5/1953 | Hinkley | 65—155 |
| 3,021,643 | 2/1962 | Blanding et al. | 65—154 |
| 3,381,347 | 5/1968 | Reinwall. | |

S. LEON BASHORE, Primary Examiner

S. R. FRIEDMAN, Assistant Examiner

U.S. Cl. X.R.

65—59, 155